July 12, 1960 F. RICHTER 2,944,868

RECORDING INSTRUMENT

Filed Oct. 2, 1959

United States Patent Office 2,944,868

Patented July 12, 1960

2,944,868

RECORDING INSTRUMENT

Friedrich Richter, Preetz im Holstein, Germany, assignor to Electroacustic Gesellschaft mit beschrankter Haftung, Kiel, Germany, a corporation of Germany Filed Oct. 2, 1959, Ser. No. 844,060

Claims priority, application Germany Oct. 4, 1958

11 Claims. (Cl. 346—74)

Figure 1:
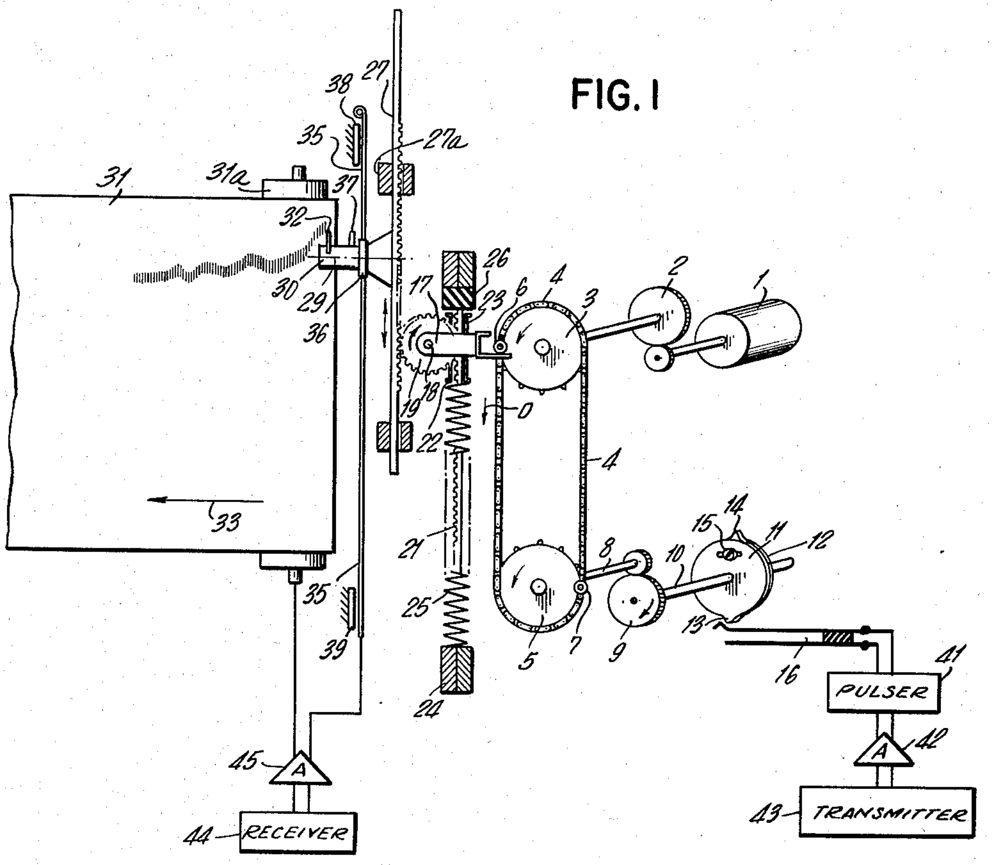

My invention relates to recording instruments whose stylus travels periodically straight across the record receiving surface at uniform speed. Such recording instruments are suitable for measuring short intervals of time and are used, for example, in echo sounding equipment for providing a record of the time elapsing between the emission of a sonic signal and the reception of its echo as indicative of depth or altitude.

In a more particular aspect, the invention relates to recording instruments of the type disclosed and claimed in my copending application Serial No. 761,391, filed September 16, 1958 and assigned to the assignee of the present invention. In these instruments, the stylus is mounted on a rack member which is displaceable in a direction transverse to the advance of the recording surface and parallel to a stationary rack member, both rack members being coupled with each other by one or more spur gears located between the two rack members and in meshing engagement with both.

It is an object of my invention to improve recording devices of the above-mentioned type toward clearer and better defined recordings by providing for a double or multiple writing action of the stylus device within a given cycle period of the stylus drive. Applied to echo sounding, it is a corresponding object of my invention to afford a double or triple sounding operation, particularly when scanning relatively large sounding ranges.

According to one of the novel features of my invention over recording instruments as disclosed in the above-mentioned copending application, the shaft of the spur-gear means which mesh with the two parallel rack members, is intermittently driven by a uniform-speed drive along a given forward direction corresponding to only one leg of reciprocating travel and is thereafter released from the drive and more rapidly returned to its starting position by means of a force-storing device, preferably a return spring, whereafter the gear shaft is again coupled with the drive and entrained for a second pass of forward travel. The uniform-speed drive preferably comprises an endless belt or chain member rotating about sprocket gears substantially as in the recording instrument of the copending application above mentioned; and the multiple recording activity of the stylus device in an improved instrument according to the present invention is afforded by virtue of the fact that the stylus passes across the entire width of the recording tape or other record-receiving surface in less than one-half of the time needed for one full rotation of the endless driving member.

The temporary coupling between the endless driving member and the stylus device is preferably effected by means of a follower structure connected with the bearing of the spur gear or gears that mesh with the two parallel racks; and the endless driving member is provided with at least two entrainer pins that are periodically engageable with the follower in order to move the stylus holder in the forward direction in opposition to the force of the return spring. After the stylus has passed over the active surface of the recording tape, the entrainer previously engaging the follower moves away therefrom so that the force-storing spring returns the stylus at relatively great speed back to the starting position. Immediately thereafter the second entrainer of the endless driving member engages the follower so that a second record-producing cycle commences. In this manner, two recording marks are produced for a single full rotation of the endless driving member, it being obvious that three recording marks are obtained if the design is such as to operate with three uniformly spaced entrainer pins of the endless driving member.

According to another feature of my invention, the stylus member is secured to the above-mentioned displaceable rack member by means of a holder that can be rotated about an axis extending parallel to the recording surface and at a right angle to the stylus travel; and the rotatable holder is provided with control means that automatically lift the stylus point off the recording surface during the return travel but cause the holder to lightly press the stylus point against the surface during the forward travel of the stylus.

Figure 2:
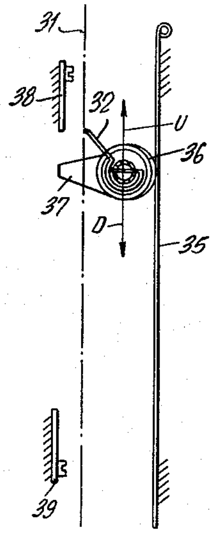

The foregoing and further objects, advantages and features of my invention will be apparent from, and will be described in, the following with reference to the embodiment of a recording device according to the invention illustrated by way of example on the accompanying drawing, in which:

Fig. 1 shows schematically the recording device applied for echo sounding such as for recording depth or indicating the presence of fish or other objects in the water; and Fig. 2 separately illustrates a detail of the same recording instrument.

The device has an electric drive motor 1 connected through a speed-change gear mechanism 2 with a chain sprocket 3. If desired, the speed-change mechanism 2 may be designed for selection of two or more graduated speed steps in order to set the instrument for respectively different measuring or sounding ranges. The sprocket 3 is engaged by an endless chain 4 which meshes with a second sprocket 5 of the same size and shape as the sprocket 3. The length of the chain 4 corresponds to three times the periphery of the pitch circle of each sprocket. Two of the link pivots of chain 4 have longer pivot pins than the other links, and the two pins carry respective rollers 6 and 7 that laterally protrude from the chain. The rollers 6 and 7 serve as entrainers and are spaced from each other a distance equal to one-half of the total chain length.

The sprocket 5 is mounted on a shaft 8 of a gearing 9 which acts as a speed-change transmission to take care of the fact that the chain length is larger than the periphery of the sprocket. In the present case the transmission ratio of gearing 9 is 3:1. The output shaft 10 of gearing 9 carries two cam discs 11 and 12 which are normally fixed with respect to shaft 10. Each cam disc has a cam lobe 13 or 14. The two lobes are opposite each other and can be accurately adjusted relative to each other by loosening a clamping screw 15, thereafter slightly turning the two discs 11 and 12 relative to each other, and then tightening the screw 15. During rotation of the shaft 10, the two cam lobes 13 and 14 sequentially close a contact 16 which releases a sonic pulse.

The contact 16 is schematically shown to be electrically connected with a pulse generator 41 which acts through an amplifier 42 upon a sonic transmitter 43. The reflected echo signals reach a sonic receiver 44 which passes the echo pulses through an amplifier 45 to the stylus device of the instrument as more fully described below. It will be understood that the schematic representation of the electric transmitting and receiving components is presented only by way of example. If desired, the transmitter and receiver may act through one and the same amplifier, or a single transducer may be used for transmitting and receiving the sonic pulses, such variations being known in the art and not essential to the invention proper.

During operation of the instrument, with chain 4 travelling at uniform speed in the direction indicated by the arrow D in Fig. 1, the entrainer rollers 6 and 7 sequentially enter into engagement with the follower 17 during the straight travel range of the chain 4 in the direction D. The entraining engagement remains preserved during the entire portion of this straight travel. The follower 17 is mounted on the shaft 18 of a pinion 19 and is also guided for linear motion by a suitable glide way (not shown) which is fixed with respect to the housing or frame structure of the instrument. The pinion 19 is in meshing engagement with a fixed rack 21 extending parallel to the straight travel path of the entrainer rollers 6 and 7. Pinion 19 also meshes with a rack 27 which extends parallel to the rack 21 and thus also parallel to the forward travel of the entrainer rollers and parallel to the travel of the stylus. If desired, the pinion 19 may be replaced by a pair of pinions firmly and coaxially joined with each other of which one meshes with rack 21 and the other with rack 27. The rack 27 is shown guided for linear motion between fixed guides 27*a* and 27*b*. The follower 17 carries a spring abutment 22 and a stop 23. Located between abutment 22 and a fixed abutment 24 at the other end of rack 21 is a helical compression spring 25 which is always under compressive stress and thus tends to move the stop 23 of follower 17 against a shock-absorbing buffer 26 of rubber or other elastic material located at the upper end of rack 21.

Mounted on the displaceable rack 27 is a stylus holder 30 which is rotatable about an axis 29 parallel to the plane of the recording surface 31 and perpendicular to the travel direction of the rack 27.

The holder 30 carries a stylus 32 consisting of spring wire which can be lifted off, or lowered onto, the recording surface 31 by corresponding rotation of holder 30 about its axis 29. The recording surface 31 is formed by a tape of recording paper of the electrically responsive type, that can be marked by passing electric sparks through the paper. The tape 31 moves at uniform speed in the direction of the arrow 33 over a metal roller 31*a* electrically connected with one output terminal of the receiving amplifier 45. A contact bar 35 is mounted parallel to the rack 27 in the vicinity of the stylus holder and is electrically connected to the other output terminal of the receiving amplifier. The contact bar 35 is frictionally engaged by a contact member 36 which is mounted on the rotatable stylus holder 30. Contact member 36 electrically connects the stylus 32 with the contact bar 35 and thus also with the receiving amplifier.

As apparent from Fig. 2, the contact member 36 touches the bar 35 in such a manner that, when the movable rack 27 moves downward in the direction of arrow D (Fig. 2), the frictional engagement between parts 30 and 35 imposes a torque upon the stylus 32 which lightly presses the stylus tip against the recording tape 31. On the other hand, when rack 27 moves in the opposite direction, designated by arrow U, the torque imposed upon the stylus has the opposite sense so that the stylus tip is lifted off the tape.

The rotatable stylus holder 30 carries a control arm 37. Two stationary stops 38 and 39 are mounted at the respective end points of the path travelled by the arm 37. At each of these two points the arm 37 engages one of the respective stops with the effect of returning the stylus holder 30 and the stylus 32 positively into or out of engagement with the recording tape.

The operation of the above-described recording instrument is as follows:

After starting the operation of the echo sounding equipment, the drive motor 1 is energized and imparts motion through gear mechanism 2 to the chain drive 3, 4, 5. The cam discs 11 and 12 are driven simultaneously so that the respective lobes 13 and 14 periodically close the pulse releasing contact 16 thus controlling the sonic transmitter to issue periodic sounding signals. When or after an individual signal is thus transmitted, one of the entrainer rollers 6 or 7 enters into engagement with the follower 17 and carries it forward in opposition to the force of spring 21. During such motion, the pinion 19 rolls along rack 21 and simultaneously entrains the rack 27 in the same direction.

Consequently the stylus 32 is moved across the recording surface 31 in a direction transverse to the tape travel, while the friction of contact member 36 along contact bar 35 causes the stylus to be lightly pressed against the tape. At the moment when an echo is being received, a marking voltage is impressed through contact bar 35 and contact member 36 between stylus 32 and roller 31*a* so that a spark passes through the recording paper and produces a mark. As soon as the entrainer roller 6 or 7 travels out of the straight travelling range of chain 4 in the direction of arrow D and moves the sprocket 5, it becomes disengaged from the follower 17. The spring 25, acting upon spring abutment 22, now pushes the entrainer 17 upward and back to the starting position against the shock-absorbing buffer 26. Due to the simultaneous return motion of the displaceable rack 27, the stylus holder and stylus are thus also returned to starting position. However before the pinion 19 reverses its direction of rotation, the control arm 37 abuts against the stop 39 and turns the stylus holder 30 in the sense required to lift the stylus 32 off the recording surface 31. During the subsequent return (upward) travel of the movable parts of the stylus device, the stylus member 32 is kept in inactive position due to the continuing friction of contact member 36 travelling along contact bar 35.

Shortly before the movable parts arrive at the uppermost position, the control arm 37 hits against the upper stop 38 and turns the stylus holder 30 in the sense required to again place the stylus tip upon the recording surface. After the movable parts of the device have returned to the starting position, the chain 4 has completed one-half rotation, and the second entrainer roller enters into engagement with the follower 17. In the meantime, the cam lobe 14 has again actuated the releasing contact 16 so that a second transmision of a sonic pulse has taken place. Now the recording operation repeats itself in the same manner while the chain 4 passes through the second half of its rotation.

The above-described embodiment of the invention thus affords a double sounding operation during one rotation of the endless driving member 4. Since the rotating speed of the endless chain 4 is determined by the scale of the desired recording, the doubled sounding sequence affords a more accurate and better visible indication on the recording tape, especially when operating with relatively large sounding ranges in which the stylus passes very slowly across the recording tape.

It will be obvious to those skilled in the art, upon a study of this disclosure, that my invention permits of various modifications with respect to design details and hence may be embodied in devices other than particularly illustrated and described herein, without departing from the essence of my invention and within the scope of the claims annexed hereto.

I claim:

1. A recording instrument comprising record carrier means for advancing a surface member, a stylus for producing a record on the surface member, an elongated carrier structure on which said stylus is mounted, said carrier structure being longitudinally displaceable in a travel direction transverse to the advance of the surface member, rotatable gear means having a shaft and being peripherally in driving engagement with said carrier structure for displacing said structure, a stationary race member extending parallel to said carrier structure in spaced relation thereto, said gear means being peripherally in engagement with said race member to roll along said race member when driving said carrier structure, a rotatable drive mechanism having a plurality of entrainer members spaced from each other along the rotary travel path of said mechanism, a follower reciprocable in a direction parallel to said carrier structure and having a bearing for said shaft so as to drive said gear means along said race member to displace said carrier structure when said follower is being reciprocated, force-storing means tending to hold said follower in a given starting position, said entrainers being sequentially engageable with said follower during a given travel portion of said drive mechanism in a direction away from starting position, whereby said stylus is periodically advanced across the surface member by said respective entrainers and each time returned by said force-storing means.

2. A recording instrument comprising record carrier means for advancing a surface member, a stylus for producing a record on the surface member, an elongated carrier structure on which said stylus is mounted, said carrier structure being longitudinally displaceable in a straight direction perpendicular to the advancing direction of the surface member, rotatable gear means having a shaft and being peripherally in driving engagement with said carrier structure for displacing said structure, a stationary race member extending parallel to said carrier structure, said gear means being peripherally in engagement with said race member to roll along said race member when driving said carrier structure, an endless drive member of normally constant speed having a rotary travel path with a straight travel portion parallel to said straight direction, said endless drive member having a plurality of entrainers uniformly spaced from each other along said rotary travel path, a follower reciprocable along said straight travel portion and engaging said shaft so as to drive said gear means to displace said carrier structure when said follower is being reciprocated, said entrainers being sequentially engageable with said follower when individually travelling along said straight travel portion to thereby intermittently advance the follower and carrier structure to cause said stylus to pass forward across the recording surface, and a return spring for returning said follower and said carrier structure with said stylus to a given starting position after completion of each forward pass of said stylus.

3. A recording instrument comprising record carrier means for advancing a surface member, a stylus for producing a record on the surface member, an elongated and longitudinally displaceable rack to which said stylus is secured, said displaceable rack extending in a travel direction transverse to the advance of the surface member, rotatable gear means having a shaft and being peripherally in driving engagement with said rack for displacing it, a stationary rack extending parallel to said displaceable rack, said gear means being peripherally in engagement with said fixed rack to roll along it when driving said displaceable rack, a drive mechanism having two mutually spaced sprocket wheels and having an endless chain extending about said sprocket wheels, said chain having between said two sprocket wheels a straight travel path parallel to said two racks, a plurality of entrainers mounted on said chain and spaced from each other along said chain, a follower having a bearing engaged by said shaft and being reciprocable along said straight path of chair travel, said entrainers being individually and sequentially engageable with said follower only when travelling along said straight path whereby said follower is periodically driven to move in a given forward direction to pass said stylus across the recording surface, and a return spring urging said displaceable rack and follower in the opposite direction whereby said stylus is returned to a given starting position after completion of each forward pass.

4. A recording instrument comprising record carrier means for advancing a surface member, stylus means for producing a record on the surface member, an elongated carrier structure longitudinally displaceable in a direction transverse to the advance of the surface member, said stylus means being connected with said carrier structure and being movable between an active recording position and an inactive position, rotatable gear means having a shaft and being peripherally in driving engagement with said carrier structure for displacing said structure, stationary race member extending parallel to said carrier structure, said gear means being peripherally in engagement with said race member to roll along it when driving said carrier structure, a drive mechanism having a continuously rotatable endless transmission member, said endless member having a portion of straight travel direction and uniform travel speed extending parallel to said carrier structure, a plurality of entrainers mounted on said endless member and spaced from each other along said endless member, a follower reciprocable along said straight travel portion and having a bearing in which said shaft is journaled, each of said entrainers being engageable with said follower only when travelling along said straight travel portion whereby said follower is periodically driven to move in a given forward direction to pass said stylus across the recording surface, a return spring engaging said follower and urging it in a direction opposed to the entrainer travel so as to return said stylus means to a given starting position after completion of each forward pass of said stylus means, and stylus control means responsive to directional change of said follower and connected with said stylus means for holding it in said active recording position during forward travel and in said inactive position during return travel of said follower.

5. In a recording instrument according to claim 2, said follower having a stop and a spring abutment, a fixed abutment spaced from said spring abutment, said spring being helical and disposed between said two abutments so as to engage them at opposite spring ends respectively, and a stationary buffer engageable by said stop when said follower is in said starting position.

6. In a recording instrument according to claim 3, said endless chain having two axially elongated link pivots equally spaced from each other and protruding laterally of the chain, and two rollers mounted on the protruding pin portions respectively, said two rollers constituting said respective entrainers.

7. A recording instrument according to claim 3, comprising a recording-pulse transmitter having a contact mechanism for periodic pulse release, said contact mechanism having a control shaft connected with one of said sprocket wheels to be driven therefrom, two cam discs having respective cam lobes located opposite each other and angularly adjustable relative to each other, and switch contacts sequentially operable by said respective cam lobes.

8. A recording instrument according to claim 4, comprising a stylus holder connecting said stylus means with said carrier structure, said holder being pivotally mounted on said carrier structure and having a pivot axis extending parallel to said surface member and perpendicularly to the travel direction of said carrier structure.

9. A recording instrument according to claim 4, comprising a stylus holder connecting said stylus means with said carrier structure, said holder being pivotally mounted on said carrier structure and having a pivot axis extending parallel to said surface member and perpendicularly to the travel direction of said carrier structure, an elongated electric contact member extending along the travel path of said follower, and a slide contact mounted on said holder and electrically connected with said stylus means, said slide contact being frictionally engageable with said contact member during travel of said follower for causing said stylus means to produce a recording mark when said contact member receives marking voltage.

10. In a recording instrument according to claim 4, said stylus control means comprising a stylus holder connecting said stylus means with said carrier structure, said holder being pivotally mounted on said carrier structure and having a pivot axis extending parallel to said surface member and perpendicularly to the travel direction of said carrier structure, an elongated electric contact member extending along the travel path of said follower, and a slide contact mounted on said holder and electrically connected with said stylus means, said slide contact being in frictional engagement with said contact member during travel of said follower and rotatable together with said holder about said pivot axis so as to cause said stylus means to be turned into engagement with the surface member during forward travel of said follower and to be turned away from the surface member during return travel of said follower.

11. A recording instrument according to claim 10, comprising two stationary stops located at the respective two ends of travel of said follower, said stylus holder having an arm abuttable against said respective stops for turning said holder to stylus lifting and lowering positions respectively when said follower reaches said respective ends of travel.

No references cited.